United States Patent
Wang et al.

(10) Patent No.: US 8,031,489 B2
(45) Date of Patent: Oct. 4, 2011

(54) SYNCHRONOUS RECTIFICATION CIRCUIT HAVING BURST MODE CONTROLLER AND CONTROLLING METHOD THEREOF

(75) Inventors: Bin Wang, Shanghai (CN); Hongyang Wu, Shanghai (CN); Jianping Ying, Shanghai (CN); Xiaoni Xin, Shanghai (CN); Qikun Wu, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 383 days.

(21) Appl. No.: 12/412,979

(22) Filed: Mar. 27, 2009

(65) Prior Publication Data

US 2009/0244934 A1 Oct. 1, 2009

(30) Foreign Application Priority Data

Mar. 28, 2008 (TW) ................................ 97111499 A

(51) Int. Cl.
*H02M 3/335* (2006.01)
(52) U.S. Cl. .................................. 363/21.06; 363/21.14
(58) Field of Classification Search ............... 363/21.02, 363/21.06, 21.14
See application file for complete search history.

(56) References Cited

U.S. PATENT DOCUMENTS

| | | | |
|---|---|---|---|
| 2008/0137379 A1* | 6/2008 | Mao | 363/17 |
| 2009/0016083 A1* | 1/2009 | Soldano et al. | 363/20 |
| 2009/0086512 A1* | 4/2009 | Fahlenkamp et al. | 363/21.06 |
| 2009/0213623 A1* | 8/2009 | Yang | 363/49 |

* cited by examiner

Primary Examiner — Adolf Berhane
Assistant Examiner — Emily Pham
(74) Attorney, Agent, or Firm — Volpe and Koenig P.C.

(57) ABSTRACT

The configuration of a synchronous rectification circuit and a controlling method thereof are provided. The proposed circuit includes a converter including a first switch and a first synchronous rectifier, and a burst mode controller including a logic process module performing one of functions of delaying one of a non-integer and at least one operating periods to generate a synchronous rectification driving signal of the first synchronous rectifier counting from a beginning of a first pulse of a driving signal of the first switch during a working time of a burst period, and turning off the synchronous rectification driving signal of the first synchronous rectifier by one of the non-integer operating period and the at least one operating period ahead of an ending of a last operating period of the driving signal of the first switch during the working time of the burst period.

20 Claims, 13 Drawing Sheets

SYNCHRONOUS RECTIFICATION CIRCUIT HAVING BURST MODE CONTROLLER AND CONTROLLING METHOD THEREOF

FIELD OF THE INVENTION

The present invention relates to the operating mode of a synchronous rectification circuit having a burst mode controller. More specifically, this invention relates to an LLC series resonant converter circuit having a burst mode controller and a buck converter circuit having a burst mode controller.

BACKGROUND OF THE INVENTION

Since the requirements on the power density and efficiency of the power supply and the circuit efficiency are more and more critical, the resonant converters are becoming more and more popular due to their high efficiency.

However, the light-load efficiency of the resonant converters still cannot meet the requirements yet. It is because that the resonant converters need a magnetizing current having a specific value to realize a soft-switching while under the light load condition, this will cause certain constant losses such as the conduction loss and the switch loss, and these losses possess a higher ratio when they are under the light-load condition than they are under the heavy-load condition.

FIG. 1 is a circuit diagram of an LLC series resonant converter in the prior art. As shown in FIG. 1, an LLC series resonant full-bridge converter includes a resonant tank having three series-connected elements: a resonant inductor Lr, a resonant capacitor Cr and a magnetizing inductor Lm. The resonant converter receives an input voltage Vin, generates an output voltage Vo, and further includes an input capacitor Ci, switches Q1-Q4, a transformer T having a primary winding and two secondary windings, a rectification circuit having synchronous switches Q5-Q6, an output capacitor Co and an load RL. FIG. 2 shows operating waveforms of the LLC series resonant converter operating under a light-load condition in the prior art. In FIG. 2, VQ1-VQ4 are driving signals of the primary side switches Q1-Q4 respectively; VQ5-VQ6 are driving signals of the secondary side switches Q5-Q6 respectively; iLr is the waveform of the resonant current; iLm is the waveform of the magnetizing current; and the difference between iLr and iLm is the primary side current of the ideal transformer T, iPo. In the region A, energy transfers from the secondary side to the primary side, and in the region B, energy transfers from the primary side to the secondary side. At the mean time, to guarantee a fully soft-switching of the LLC resonant converter, the magnetizing current iLm must be kept at almost the same level during a light-load condition as that during a heavy-load condition. And all these increase the losses of the circuit. Thus, without any improvements, the light-load efficiency of the above-mentioned resonant circuit is much lower than the heavy-load efficiency of the same.

To increase the light-load efficiency of the resonant circuit, the burst mode control method is often adopted. FIG. 3 shows the operating waveforms of the LLC series resonant converter under a light-load condition wherein the resonant converter adopts the burst mode control method. In FIG. 3, Vds is the voltage across the drain and the source of the switch Q2/Q3; t0-t4 is a burst period comprising several operating period; t0-t2 is the working time and t2-t4 is the breaking time. Under this kind of operating method, the output capacitor Co is charged only during the working time t0-t2. While during t2-t4, the resonant converter stops operation, and the output capacitor Co is discharged and provides energy to the load RL. During the working time t0-t2, the resonant converter operates just like it is under the heavy-load condition. Thus the light-load efficiency of the resonant converter adopting the burst control method is almost equal to the heavy-load efficiency during the work time t0-t2.

But under this burst mode control method, the driving of the synchronous rectifiers in the secondary side is generally not optimized and this will influence the circuit's efficiency. There are mainly two ways to deal with the driving of the synchronous rectifiers under the burst mode control. One is to turn on the synchronous rectifiers just at the same timing that the corresponding primary switches are turned on (ignoring the timing difference between the turning on signals of the primary switches and the secondary side synchronous rectifiers due to the propagation delay). As shown in FIG. 3, VQ5 (VQ6) is the driving signal of the synchronous rectifier Q5 (Q6); VQ1, VQ2, VQ3 and VQ4 are the corresponding driving signal of the primary switches Q1, Q2, Q3 and Q4. Switch Q5 is turned on at the same timing as that of Q1 and Q4; switch Q6 is turned on at the same timing as that of Q2 and Q3. Before the timing t0, the resonant tank of the resonant circuit has experienced the oscillations; the currents of the resonant inductor and the magnetizing inductor and the voltage across the resonant capacitor are close to zero basically; and after the synchronous rectifier is turned on at the timing t0, the voltage of the magnetizing inductor Lm of the primary side equals to the voltage across the output capacitor Co and the energy is transferred back from Co to the primary side. As shown in FIG. 3, the output voltage Vo appears a dramatically drop in t0-t1 due to the energy's transferring back, and this results in a large iLr in the next operating period and the increasing power loss. The other method is that the synchronous rectifier does not operate when the circuit operates under the burst mode control method. That is to say, the secondary side current flows through the body diodes of Q5 and Q6 to charge the output capacitor Co during the working time period t0-t2 of the burst period, and this prevents the energy's transferring back from the secondary side to the primary side. But the drawback is the conduction loss is increased since the forward voltage drop of the body diode is much larger than that of the synchronous rectifier.

To resolve the aforementioned conventional controlling problems, a controlling method is proposed in the present invention so as to raise the light-load efficiency of the resonant circuit to its extreme limit.

Keeping the drawbacks of the prior arts in mind, and employing experiments and research full-heartily and persistently, the applicant finally conceived a synchronous rectification circuit having a burst mode controller and a controlling method thereof.

SUMMARY OF THE INVENTION

It is therefore an object of the present invention to provide an operating mode of a synchronous rectification circuit having a burst mode controller so as to decrease the loss, raise the light-load efficiency of the resonant circuit to its extreme limit, and apply to an LLC resonant converter circuit and a buck converter circuit.

According to the first aspect of the present invention, a synchronous rectification circuit includes a converter including a first switch and a first synchronous rectifier, and a burst mode controller including a logic process module performing one of functions of delaying one of a non-integer operating period and at least one operating period to generate a synchronous rectification driving signal of the first synchronous rectifier counting from a beginning of a first pulse of a driving signal of the first switch during a working time of a burst period, and turning off the synchronous rectification driving signal of the first synchronous rectifier by one of the non-integer operating period and the at least one operating period ahead of an ending of a last operating period of the driving signal of the first switch during the working time of the burst period.

Preferably, the converter is a resonant converter including a resonant tank having an magnetizing inductor and a transformer having a primary side connected to the first switch and a secondary side connected to the first synchronous rectifier, due to delaying one of the non-integer operating period and the at least one operating period to generate the synchronous rectification driving signal of the first synchronous rectifier counting from the beginning of the first pulse of the driving signal of the first switch during the working time of the burst period, the first synchronous switch is turned on when a voltage across the magnetizing inductor is in one of states of being larger than and being relatively close to a predetermined value so as to avoid an energy transferring back while the first synchronous rectifier is switching, and the predetermined value is an equivalent value on the magnetizing inductor of the primary side by reflecting an output voltage of the secondary side to the primary side.

Preferably, the first synchronous rectifier includes a body diode, and due to delaying one of the non-integer operating period and the at least one operating period to generate the synchronous rectification driving signal of the first synchronous rectifier counting from the beginning of the first pulse of the driving signal of the first switch during the working time of the burst period, the first synchronous rectifier operating under a burst mode is on after the body diode is conducting to avoid the energy transferring back so as to relatively decrease a loss of the circuit.

Preferably, the resonant converter is one of a series resonant converter and a parallel resonant converter.

Preferably, the series resonant converter is an LLC series resonant converter.

Preferably, the circuit further comprises a driver, the logic process module includes a first D-type flip-flop receiving a burst duty cycle signal and a first pulse signal, and generating a first output signal, a first delay circuit receiving the first output signal and generating a first delay signal, a second delay circuit receiving the first delay signal and generating a second delay signal, a first OR gate receiving the first and a second pulse signals and generating a second output signal, a second D-type flip-flop receiving the second delay signal and the second output signal, and generating a third delay signal, a first AND gate receiving the first pulse signal and the first delay signal, and generating a first primary side switch signal, a second AND gate receiving the first delay signal and the second pulse signal, and generating a second primary side switch signal, a third AND gate receiving the first primary side switch signal and the third delay signal, and generating a first secondary side switch signal, and a fourth AND gate receiving the second primary side switch signal and the third delay signal, and generating a second secondary side switch signal, wherein the driver receives the first and the second primary side switch signals and the first and the second secondary side switch signals, and generates the synchronous rectification driving signal to drive the first synchronous rectifier.

Preferably, the circuit further includes a second synchronous rectifier and a second to a fourth switches connected to the primary side of the transformer, wherein the burst mode controller further includes a sensing resistor electrically connected to the resonant converter in series and generating a load current sensing signal, a burst duty generator electrically connected to the sensing resistor, receiving the load current sensing signal and generating a burst duty cycle signal, a feedback control circuit coupled to the resonant converter, receiving an output voltage feedback signal and a reference voltage and generating a frequency control signal, a voltage-controlled oscillator (VCO) receiving the burst duty cycle signal and the frequency control signal and generating a first and a second pulse signals, and a driver receiving a first and a second primary side switch signals and a first and a second secondary side switch signals and generating a first to a fourth primary side driving signals and a first and a second secondary side driving signals, wherein the logic process module receives the first and the second pulses signals and the burst duty cycle signal so as to generate the first and the second primary side switch signals and the first and the second secondary side switch signals, the first to the fourth primary side driving signals are used to drive the first to the fourth switches respectively, the first and the second secondary side driving signals are used to drive the first and the second synchronous rectifiers respectively, the first secondary side driving signal is the synchronous rectification driving signal, and the first primary side driving signal is the driving signal of the first switch.

Preferably, the converter is a pulse width modulation (PWM) converter.

Preferably, the PWM converter is a buck converter having an inductor, and due to turning off the synchronous rectification driving signal of the first synchronous rectifier by one of the non-integer operating period and the at least one operating period ahead of the ending of the last operating period of the driving signal of the first switch during the working time of the burst period, the first synchronous rectifier is turned off when a current flowing through the inductor is reversed so as to avoid an energy transferring back when the first synchronous rectifier is switching.

Preferably, the circuit further includes a driver, the logic process module includes a first D-type flip-flop receiving a burst duty cycle signal and a first pulse signal, and generating a first output signal, a first delay circuit receiving the first output signal and generating a first delay signal, a first AND gate receiving the first pulse signal and the first delay signal, and generating a first switch signal, and a second AND gate receiving the first delay signal and a second pulse signal, and generating a second switch signal, wherein the driver receives the first and the second switch signals and generates the driving signal and the synchronous rectification driving signal to drive the first switch and the first synchronous rectifier respectively.

Preferably, the burst mode controller further includes a sensing resistor electrically connected to the buck converter in series and generating a load current sensing signal, a burst duty generator electrically connected to the sensing resistor, receiving the load current sensing signal and generating a burst duty cycle signal, a feedback control circuit coupled to the buck converter, receiving an output voltage feedback signal and a reference voltage, and generating a feedback control signal, a pulse-width modulator receiving the burst duty cycle signal and the feedback control signal, and generating a first and a second pulse signals, and a driver receiving a first and a second switch signals and generating the driving signal and the synchronous rectification driving signal to drive the first switch and the first synchronous rectifier respectively, wherein the logic process module receives the first and the second pulses signals and the burst duty cycle signal and generates the first and the second switch signals.

According to the second aspect of the present invention, a burst mode controlling method for a synchronous rectification circuit including a first switch and a first synchronous rectifier includes one of steps of: delaying one of a non-integer operating period and at least one operating period to generate a synchronous rectification driving signal of the first synchronous rectifier counting from a beginning of a first pulse of a driving signal of the first switch during a working time of a burst period, and turning off the synchronous rectification driving signal of the first synchronous rectifier by one of the non-integer operating period and the at least one operating period ahead of an ending of a last operating period of the driving signal of the first switch during the working time of the burst period to turn off the first synchronous rectifier.

Preferably, the synchronous rectification circuit is a resonant converter circuit when the method performs the delaying step.

Preferably, the synchronous rectification circuit further includes a transformer having a primary and a secondary sides and an output capacitor coupled to the secondary side and the first synchronous rectifier, the first synchronous rectifier includes a body diode, and the secondary side has a voltage thereon relatively very close to a voltage of the output capacitor when the body diode is turned on.

Preferably, the synchronous rectification circuit further includes a transformer having a primary and a secondary sides and an output capacitor coupled to the secondary side and the first synchronous rectifier, the first synchronous rectifier includes a body diode, and the secondary side has a voltage thereon larger than a voltage of the output capacitor when the body diode is turned on.

Preferably, the synchronous rectification circuit is a pulse width modulation (PWM) converter circuit when the method performs the advancing step.

According to the third aspect of the present invention, a burst mode controlling method for a synchronous rectification circuit including a first and a second switches and a first and a second synchronous rectifiers includes steps of: turning on the first and the second synchronous rectifiers firstly by an alternate method during a plurality of burst periods; delaying one of a non-integer operating period and at least one operating period to generate a synchronous rectification driving signal of the first synchronous rectifier counting from a beginning of a first pulse of a driving signal of the first switch during a working time of a burst period when the first synchronous rectifier is turned on firstly; and delaying one of a non-integer operating period and at least one operating period to generate a synchronous rectification driving signal of the second synchronous rectifier counting from a beginning of a first pulse of a driving signal of the second switch during a working time of a burst period when the second synchronous rectifier is turned on firstly.

Preferably, the synchronous rectification circuit is a resonant converter circuit.

The present invention may best be understood through the following descriptions with reference to the accompanying drawings, in which:

DETAILED DESCRIPTION OF THE PREFERRED EMBODIMENT

Figure 4A:
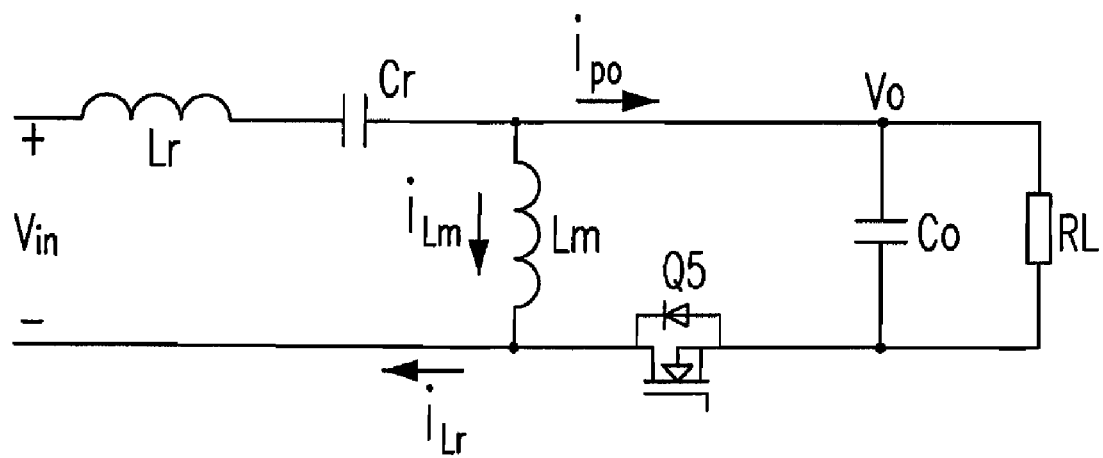
FIG. 4(a) shows an equivalent circuit diagram of an LLC series resonant converter at the beginning of a burst period according to the present invention.
Figure 4B:
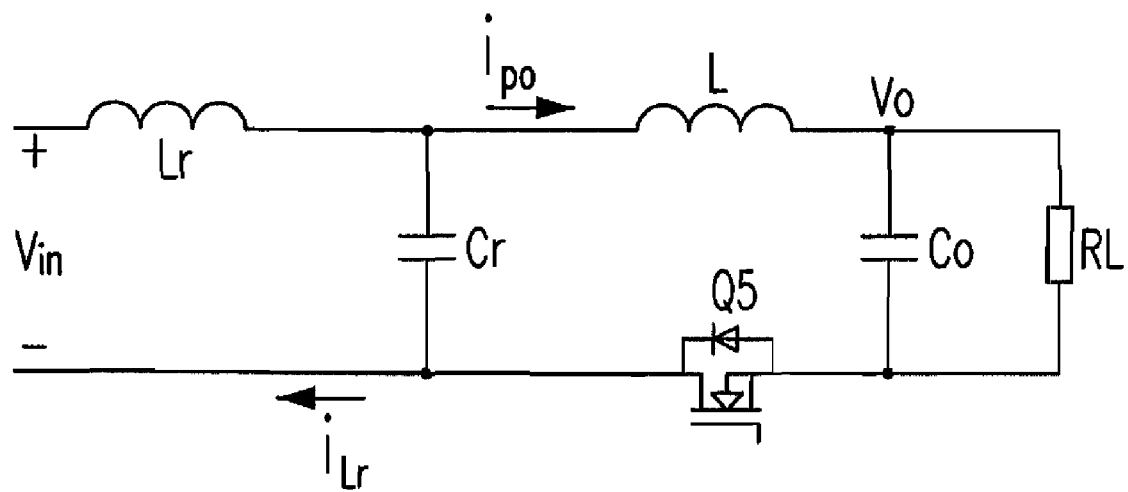
FIG. 4(b) shows an equivalent circuit diagram of an LLC parallel resonant converter at the beginning of a burst period according to the present invention.

The controlling method proposed in the present invention optimizes the driving signals of the synchronous rectifiers of the resonant circuit when operating under the burst mode control. At the beginning of one burst period, the current of the resonant inductor Lr, iLr, and the voltage of the resonant capacitor Cr, Vcr, are almost equal to zero (see FIG. 1) due to the oscillation the resonant tank has experienced in the breaking time of the previous burst period. At the beginning of the burst period, due to the switching of the primary switches Q1-Q4 (see FIG. 1 also), the resonant tank receives the voltage source Vin and the equivalent circuits are shown in FIGS. 4(a)-4(b). FIG. 4(a) shows an equivalent circuit of an LLC series resonant converter at the beginning of a burst period according to the present invention, and FIG. 4(b) shows an equivalent circuit of an LLC parallel resonant converter at the beginning of a burst period according to the present invention. In FIGS. 4(a)-4(b), the secondary side circuits have been reflected to the primary side. Using the series resonant circuit in FIG. 4(a) as an example to illustrate the operational principles, Lr is a resonant inductor; Cr is a resonant capacitor; Lm is an magnetizing inductor of the transformer; Q5 is a secondary side synchronous rectifier which is turned on and off during the working time of this burst period, and a secondary side filter capacitor (output capacitor) Co and a load RL are connected to Q5. The initial values of iLr, Vcr and iLm are either equal to zero, or the values very close to zero. The series resonant tank includes Lr, Lm and Cr, and carries out the resonant operation under the excitation of the power source voltage. Since the voltage across the magnetizing inductor Lm is less than the voltage reflected from the secondary side (this voltage is usually being designed as 1.1 times of the primary side voltage) during this operating period, the body diode of Q5 is always reverse biased under the condition that there is no driving signal. If the synchronous rectifier Q5 is turned on at that moment, a specific voltage is reflected from the secondary side to the magnetizing inductor Lm, then the energy is transferring back from the secondary, and thus the losses are increased. The judging conditions for the specific moment of turning on the synchronous rectifiers Q5/Q6 are turning on the synchronous rectifiers Q5/Q6 when the voltage across the magnetizing inductor Lm is either larger than or close to the value of the voltage reflected from the secondary side and the body diodes of the synchronous rectifiers Q5/Q6 are forced to be conducted. Then the best controlling effect could be reached. The specific moment is realized through generating a corresponding synchronous rectification driving signal after a quarter operating period, or one half operating period, or one operating period, or a few operating periods, or a non-integer operating period counting from the beginning of a first driving signal of the primary side during a working time of a burst period (e.g., "to generate a corresponding synchronous rectification driving signal after one operating period" means to diminish the first driving pulse of the synchronous rectification driving signal during a working time of a burst period), and the voltage across the magnetizing inductor Lm is so large that a secondary side energy's transferring back could not happen. The main differences between FIG. 4(b) and FIG. 4(a) are that a main inductor L is added and the magnetizing inductor Lm is omitted. The analysis of the parallel resonant circuit and that of the series resonant circuit are almost the same in principle. Through careful design, the aforementioned conditions could be fulfilled by diminishing the first pulse of each of the synchronous rectification driving signal generated according to the preferred embodiments of the present invention.

Figure 5:
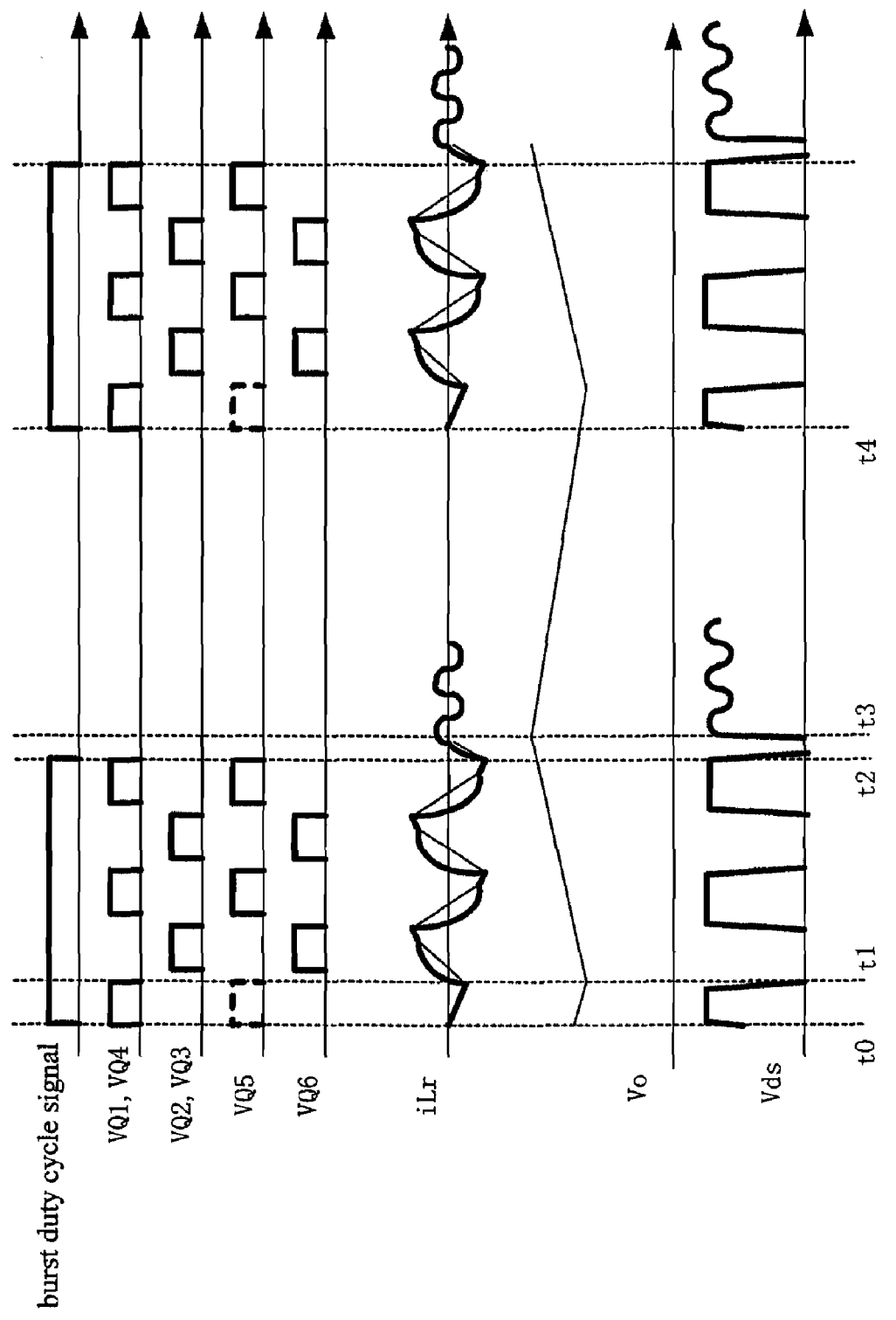
FIG. 5 shows operating waveforms of an LLC series resonant converter circuit according to the first preferred embodiment of the present invention.
Figure 6:
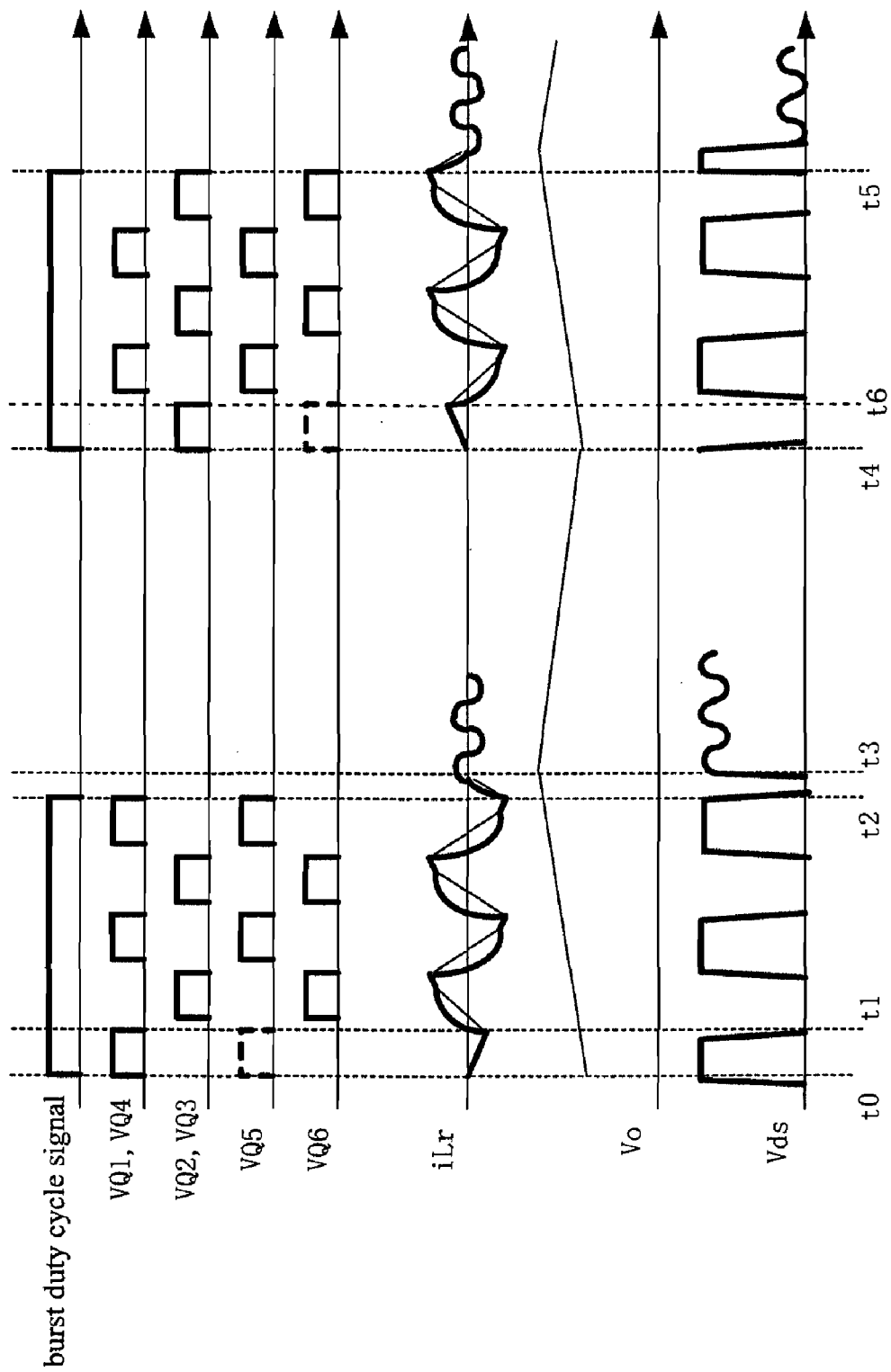
FIG. 6 shows operating waveforms of an LLC series resonant converter circuit according to the second preferred embodiment of the present invention.

FIG. 5 shows operating waveforms of an LLC series resonant converter circuit according to the first preferred embodiment of the present invention. In FIG. 5, t0-t4 is a burst period, t0-t2 is the working time, and t2-t4 is the breaking time. The primary side driving signals VQ1-VQ4 are generated normally during the time period t0-t2, the first pulse of synchronous rectification driving signal VQ5 is diminished during t0-t1, that is to say, the driving signal VQ5 is generated after one operating period from the generating of the first pulse of the driving signal of VQ1-VQ4. And the initial energy in the resonant tank is entirely provided by the energy in primary side of the transformer T such that the energy stored in secondary side of the transformer T would not be transferred back towards the primary side during t0-t1. After t1, the synchronous rectification driving pulses are generated normally and continuously again, and this guarantees that the conduction losses are minimized when the energy is transferred to the secondary side. During the working time of each burst period in FIG. 5, the synchronous rectifier (Q5) is always the first one to be turned on, therefore, the first pulse of the synchronous rectification driving signal - - - that is to say, the first pulse of the driving signal of Q5 is always diminished. However, a different controlling method could be employed, e.g. the two synchronous rectifiers Q5/Q6 could be the first one to be turned on alternately during the plurality of burst periods, and the first pulse of the synchronous rectification driving signal will be the first pulse of the driving signals of Q5 or that of Q6 alternately. Then the first pulses of respective switch Q5/Q6 are diminished alternately (e.g., the first pulse of Q5 is diminished during t0-t1, and the first pulse of Q6 is diminished during t4-t6) such that the two synchronous rectification signals of Q5/Q6 are delayed by one operating period alternately - - - that is to say, the two synchronous rectification signals of Q5/Q6 alternately fall behind an operating period counted from the beginning of the respective first pulses of corresponding driving signals of the primary side ((VQ1, VQ4) or (VQ2, VQ3)) as shown in FIG. 6. FIG. 6 shows the operating waveforms of an LLC series resonant converter circuit according to the second preferred embodiment of the present invention. In the above-mentioned FIGS. 5 and 6, the circuit diagrams applied to FIGS. 5 and 6 are the same, but the controlling methods applied to FIGS. 5 and 6 are different.

Figure 1:
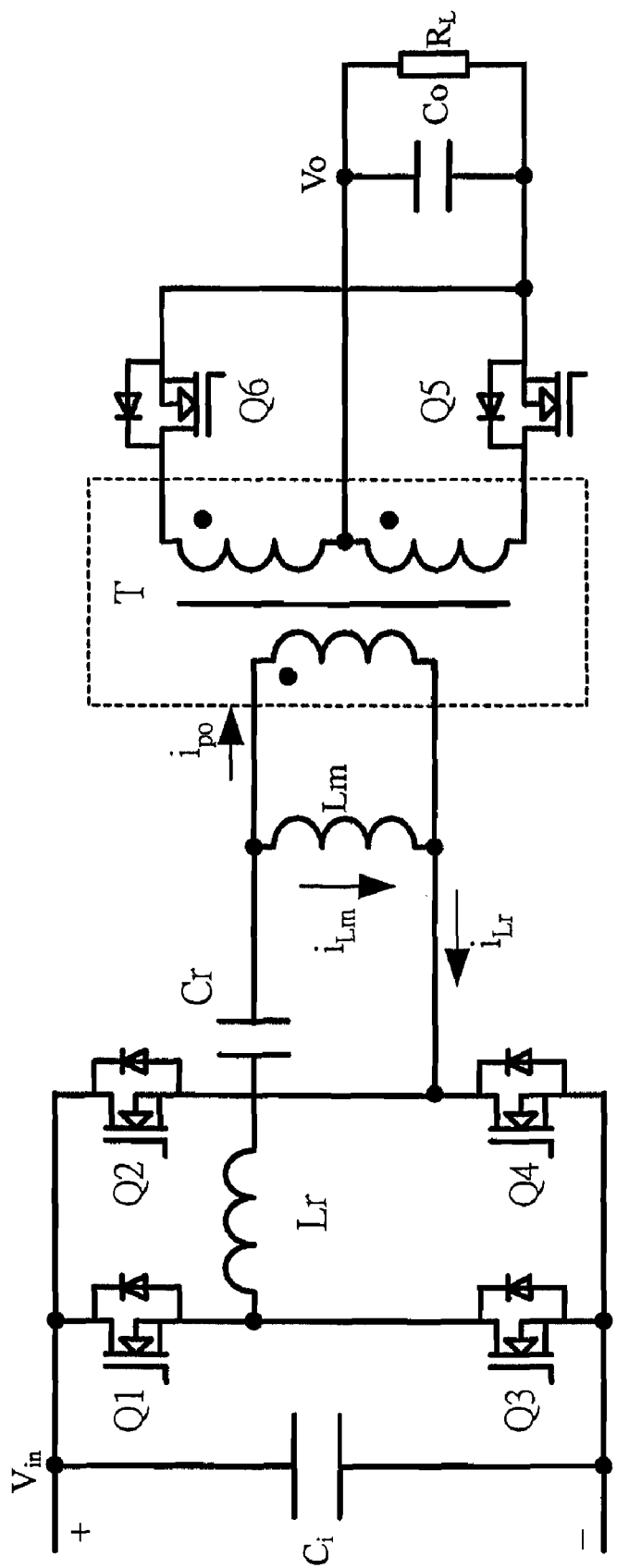
FIG. 1 shows a circuit diagram of an LLC series resonant converter in the prior art.
Figure 2:
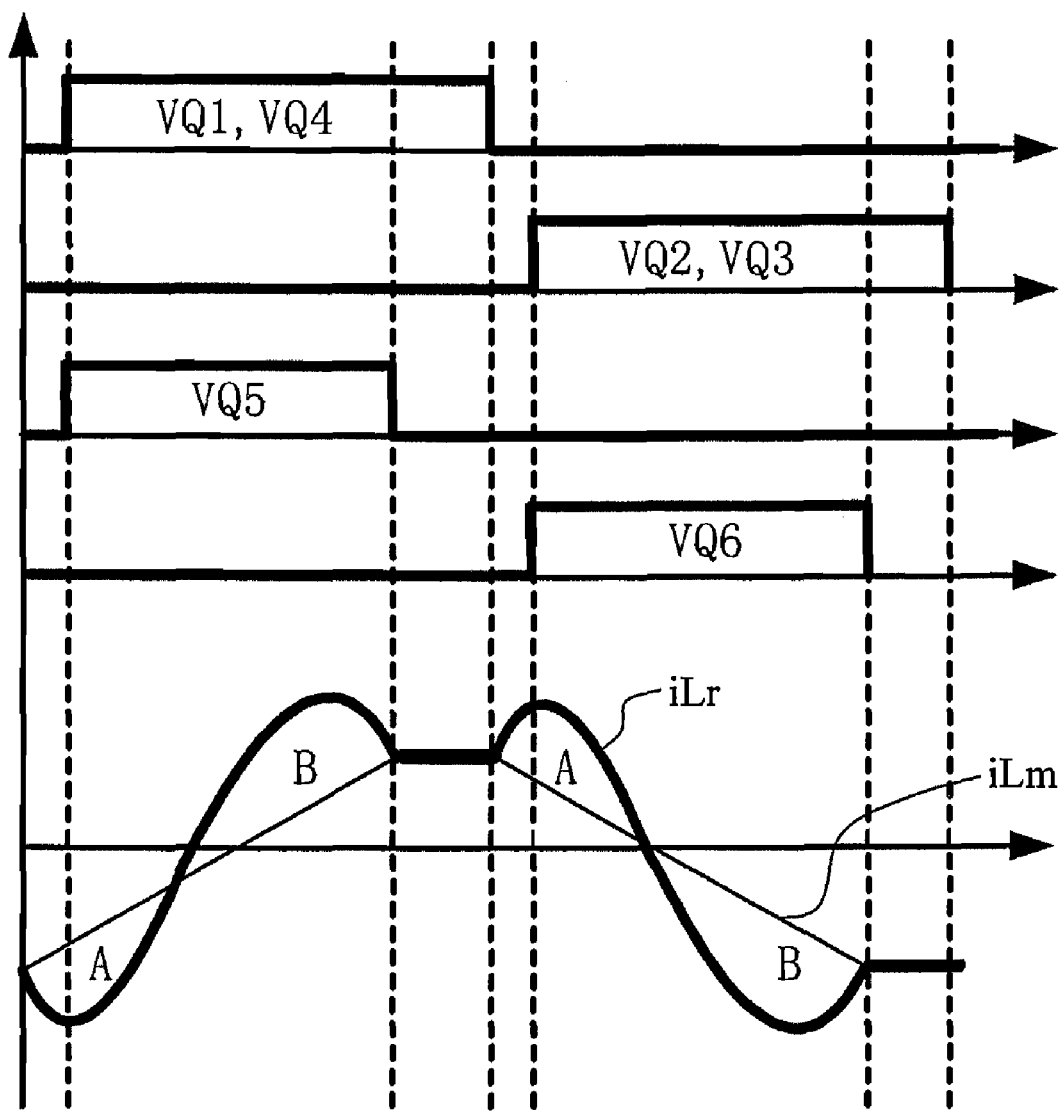
FIG. 2 shows operating waveforms of the LLC series resonant converter operating under a light-load condition in the prior art.
Figure 3:
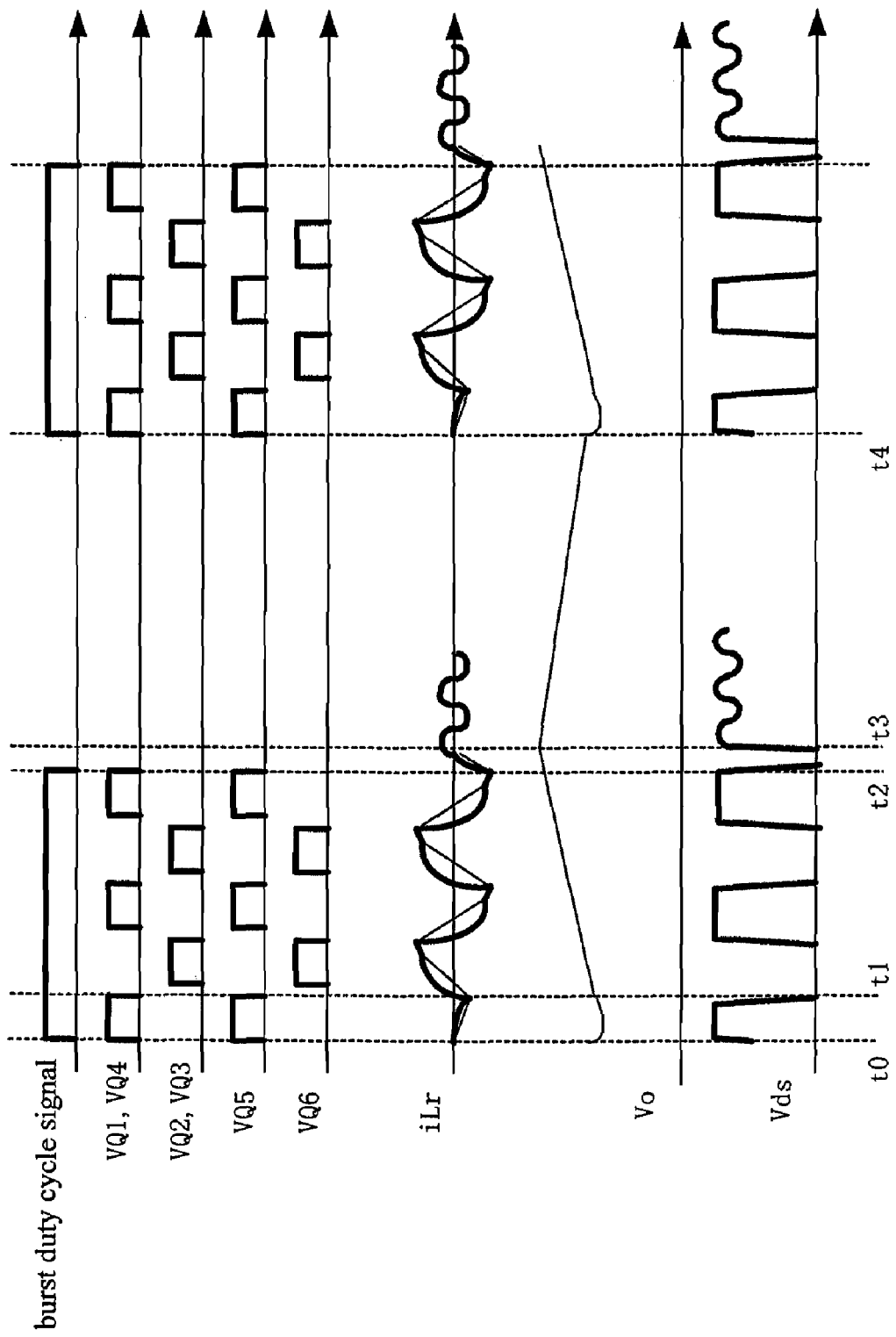
FIG. 3 shows operating waveforms of the LLC series resonant converter operating under a light-load condition, wherein the resonant converter adopts a burst mode control method in the prior art.
Figure 7:
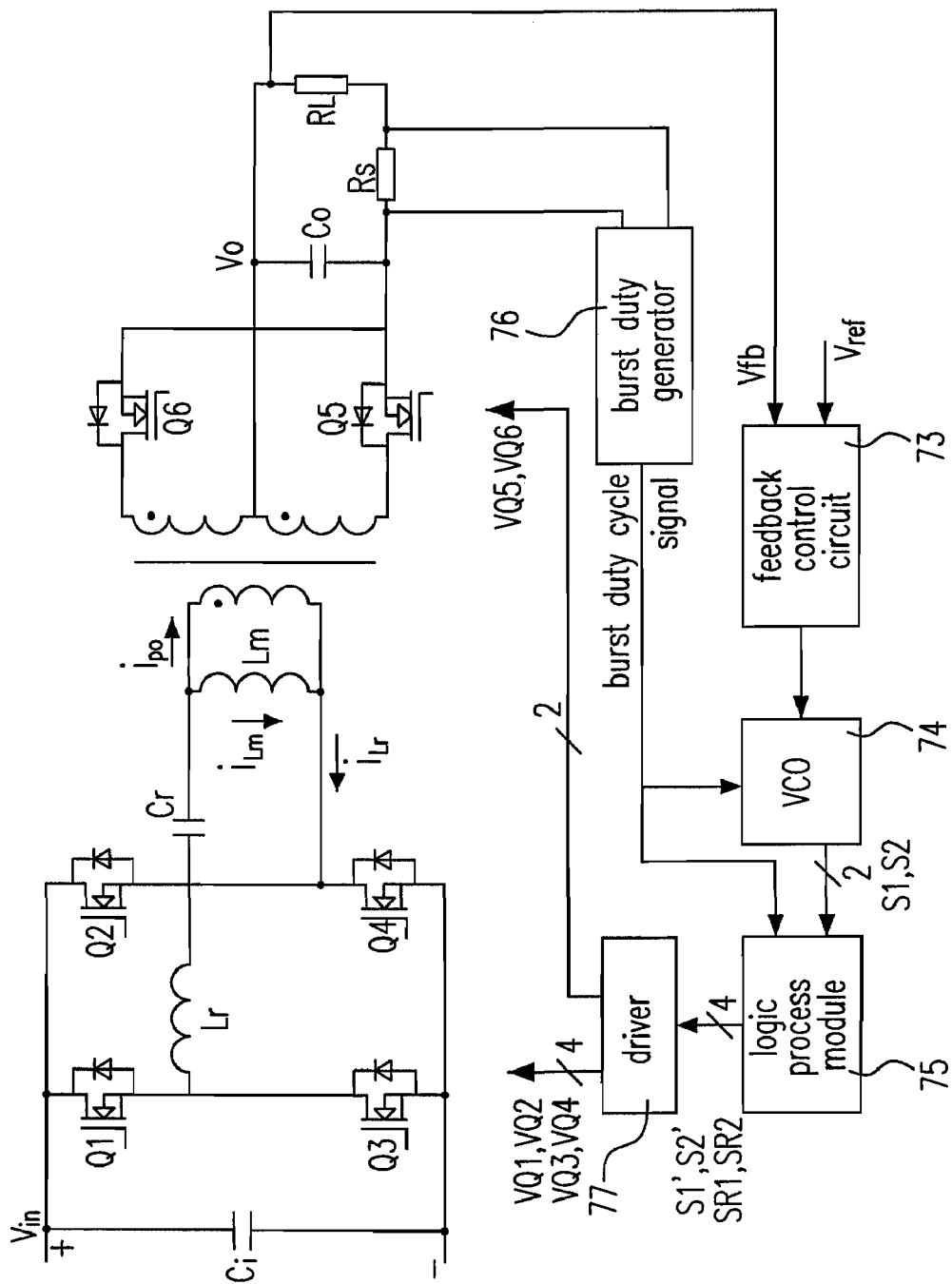
FIG. 7 shows a schematic circuit diagram of the LLC series resonant converter circuit according to the first preferred embodiment of the present invention.

FIG. 7 is a schematic circuit diagram of the LLC series resonant converter circuit according to the first preferred embodiment of the present invention. Please refer to FIG. 7, except for the series resonant converter as shown in FIG. 1, the series resonant converter circuit further includes a driver 77 and a burst mode controller including a measuring resistor Rs, a feedback control circuit 73, a voltage-controlled oscillator (VCO) 74, a logic process module 75 and a burst duty generator 76.

The feedback control circuit 73 receives two inputs Vfb and Vref and outputs a frequency control signal, wherein Vfb is a feedback of the output voltage Vo and Vref is a reference voltage. This frequency control signal is then transmitted to the VCO 74, and the VCO converts this frequency control signal to pulse outputs S1 and S2, each of which has corresponding frequency. The burst duty generator 76 senses the load current through the sensing resistor Rs and generates burst duty cycle signals having different widths varied according to the load conditions. The pulse-width of the burst duty cycle signal is relatively wide when there is a relatively heavy load, and on the contrary, the pulse-width of the burst duty cycle signal is relatively narrow when there is a relatively light load. The burst duty cycle signal is received by the VCO 74 to guarantee that the outputting pulses S1 and S2 and the burst duty cycle signal are synchronous at t0, and the burst duty cycle signal is also received by the logic process module 75 for generating switch signals of the primary side S1'-S2' and switch signals of the secondary side SR1-SR2 as shown in FIG. 7. After these switch signals of the primary and secondary sides going through the driver 77, the driving signals of the primary side VQ1-VQ4 and the driving signals of the secondary side VQ5-VQ6 are generated and used to drive the primary side switches Q1-Q4 and the secondary side synchronous rectifiers Q5-Q6 of the LLC resonant series converter.

Figure 8:
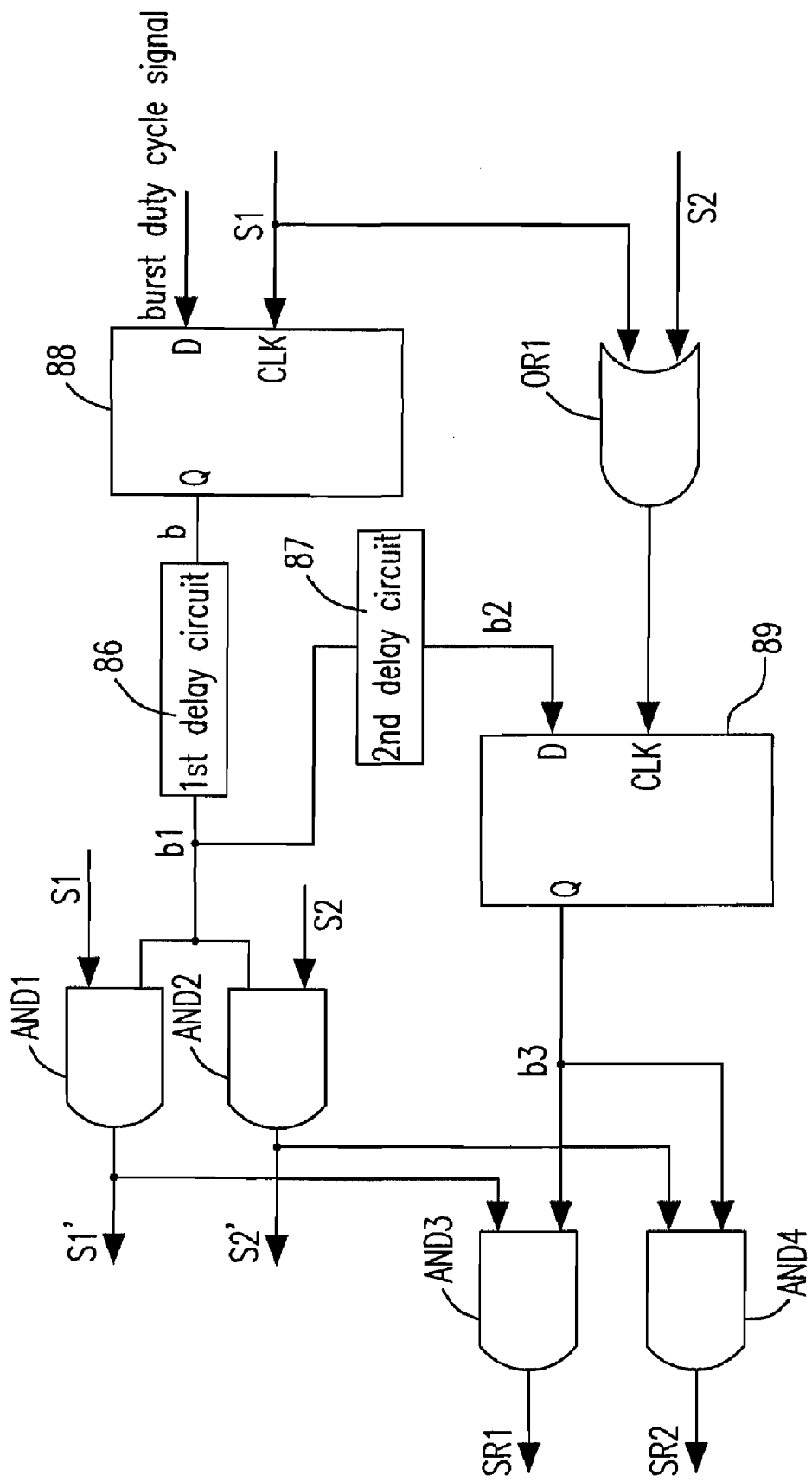
FIG. 8 shows a circuit diagram of a logic process module of the LLC series resonant converter circuit according to the first preferred embodiment of the present invention.
Figure 9:
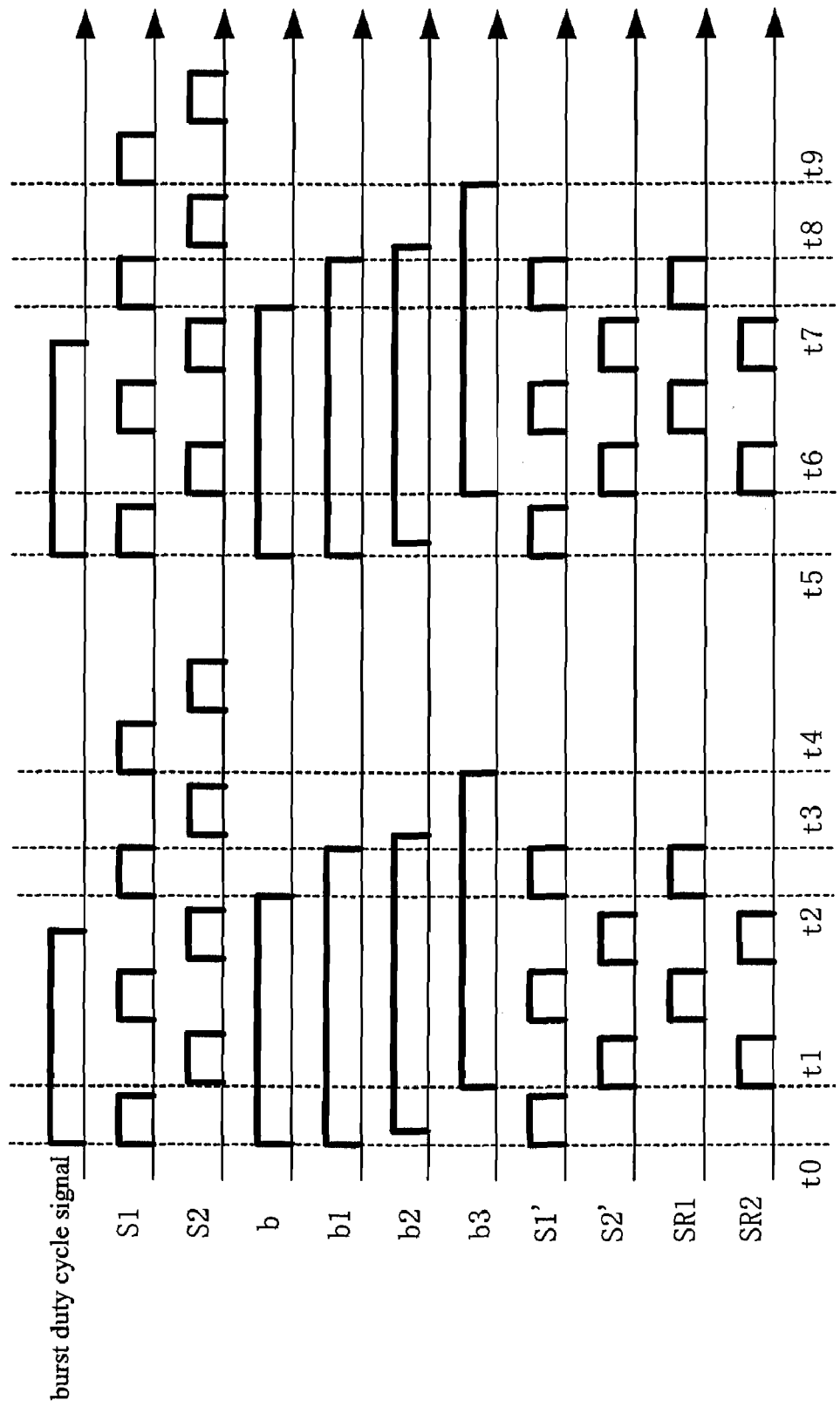
FIG. 9 shows operating waveforms of the logic process module of the LLC series resonant converter circuit according to the first preferred embodiment of the present invention.

FIG. 8 is a circuit diagram of a logic process module of the LLC series resonant converter circuit according to the first preferred embodiment of the present invention. The logic process module 75 includes three input signals (a burst duty cycle signal, pulse S1 and pulse S2), a first and a second delay circuits 86 and 87, a first and a second D-type flip-flops 88 and 89, an OR gate OR1 and AND gates AND1-AND4. In FIG. 8, the burst duty cycle signal is accepted by the D-terminal of the first D-type flip-flop 88, the pulse S1 is employed as the clock signal of the first D-type flip-flop 88, and these will guarantee that both the ascending edge and the descending edge of the output signal b of the first D-type flip-flop 88 are kept synchronous with the ascending edges of pulse S1. FIG. 9 shows the operating waveforms of the logic process module of the LLC series resonant converter circuit according to the first preferred embodiment of the present invention. t0-t5 is a burst period; t0-t4 is the working time; and t4-t5 is the breaking time. The signal b is rising at t0, kept constant between t0-t2 and then declined at t2. And both of the ascending and the descending edges of signal b are synchronous with the ascending edges of pulse S1. After the signal b going through the first delay circuit 86, the descending edge of signal b is delayed for a certain period of time such that the signal b1 is formed properly, e.g., the descending edge of b1 is guaranteed to be located at t3, and t3 is where the descending edge of pulse S1 is. This signal b1 is respectively going through two "AND" gates with the pulses S1 and S2 for generating switch signals of the primary side S1' and S2'. An "OR" gate receives the pulses S1 and S2 and generates the clock signal of another D-type flip-flop 89. And the D-terminal of the flip-flop 89 receives the signal b2 which is generated by sending the signal b1 via the second delay circuit 87. As shown in FIG. 9, the output signal b3 of the D-type flip-flop 89 rises at t1, declines at t4, and engages in an "AND" logic operation with the switch signals of the primary side S1' and S2' to generate switch signals of the secondary side SR1 and SR2. This realizes the function of diminishing the first pulse of the synchronous rectification signal, that is to say, a corresponding driving signal of the secondary side is generated by delaying one operating period counted from the beginning of the first pulse of the driving signal of the primary side.

Figure 10:
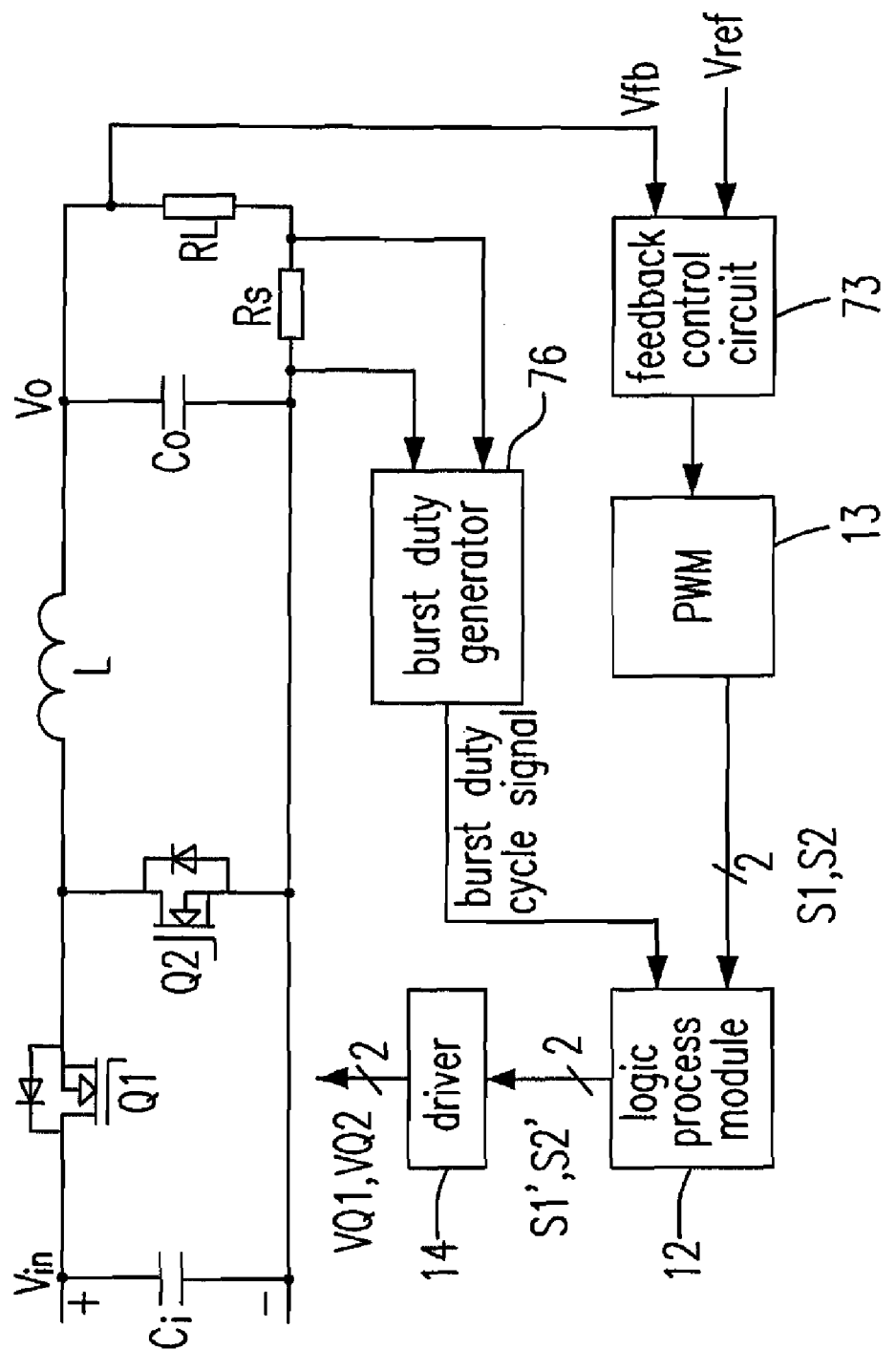
FIG. 10 shows a schematic circuit diagram of a buck converter circuit according to the third preferred embodiment of the present invention.

The controlling method proposed by the present invention can also be applied to the pulse-width modulation converter circuit preventing the output energy's transferring back problem caused by the synchronous rectification. FIG. 10 is a schematic circuit diagram of a buck converter according to the third preferred embodiment of the present invention. In FIG. 10, the buck converter includes an input capacitor Cin, a first switch Q1, a first synchronous rectifier Q2, an inductor L, an output capacitor Co and a load RL. Except for the above-mentioned, the buck converter further includes a driver 14 and a burst mode controller comprising a sensing resistor Rs, a feedback control circuit 73, a pulse-width modulator (PWM) 13, a logic process module 12 and a burst duty generator 76. The feedback control circuit 73 outputs a proper duty ratio according to the load. And after the duty ratio goes through the PWM 13, the pulses S1 and S2 for switches Q1 and Q2 are generated. The burst duty generator 76 generates burst duty cycle signals having different widths varied according to the load conditions. These burst duty cycle signals and the pulses S1 and S2 for switches Q1 and Q2 go through the logic process module 12 to perform certain logic operations and to generate the switch signals S1' and S2' during the burst period. After these primary side and secondary side switch signals going through the driver 14, and the driving signal VQ1 and the driving signal VQ2 are generated to drive the switches Q1-Q2. Observing from FIG. 10, VQ1 and VQ2 are complementary signals, and VQ2 is the synchronous rectification signal of the first synchronous rectifier Q2.

Figure 11:
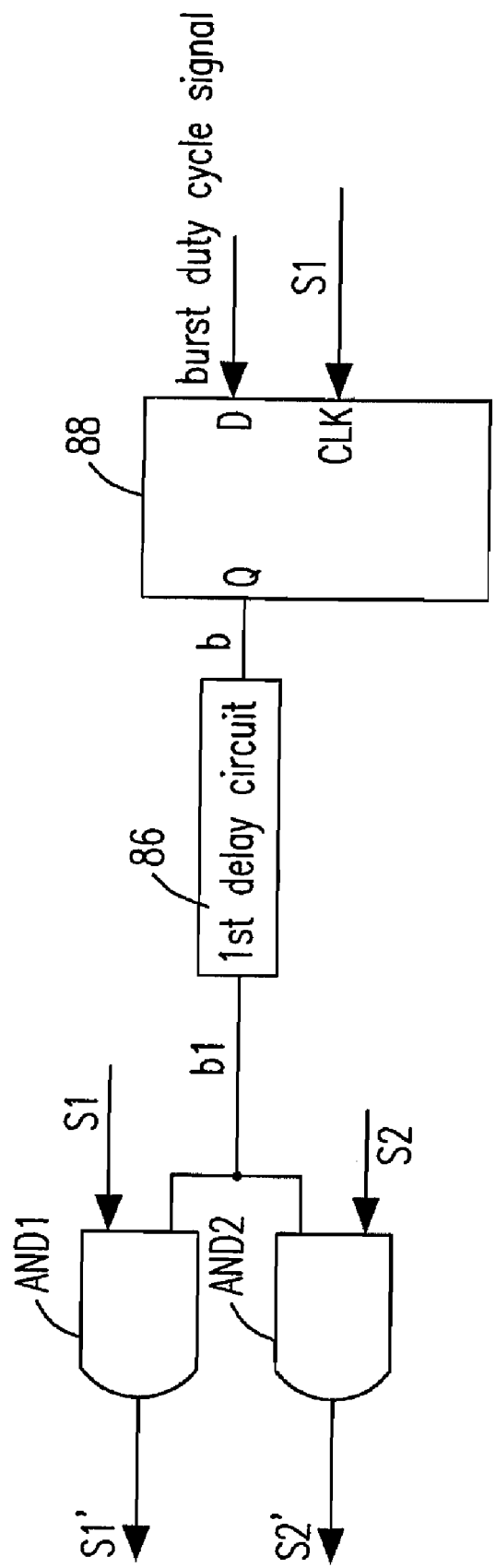
FIG. 11 shows a circuit diagram of a logic process module of the buck converter circuit according to the third preferred embodiment of the present invention.

FIG. 11 is a circuit diagram of a logic process module of the buck converter according to the third preferred embodiment of the present invention. The logic process module 12 also includes three inputs (a burst duty cycle signal, pulse S1 and pulse S2), a first delay circuit 86, a first D-type flip-flop 88 and AND gates AND1-AND2. In FIG. 11, the burst duty cycle signal is received by the D-terminal of the first D-type flip-flop 88, the pulse S1 is employed as the clock signal of the first D-type flip-flop 88, and these will guarantee that both the ascending edge and the descending edge of the output signal b of the first D-type flip-flop 88 are kept synchronous with the ascending edges of pulse S1.

Figure 12:
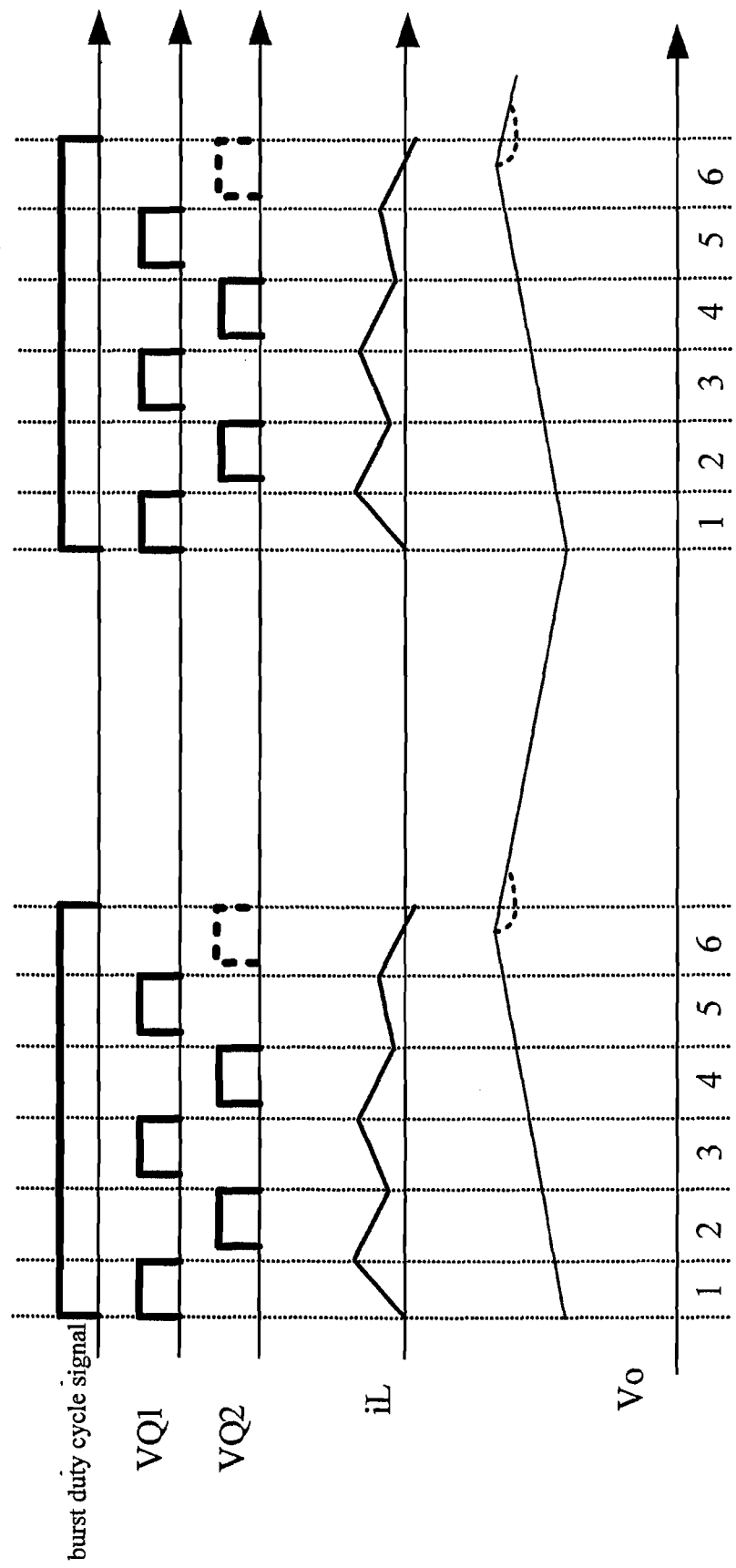
FIG. 12 shows operating waveforms of the buck converter circuit according to the third preferred embodiment of the present invention.

FIG. 12 shows the operating waveforms of the logic process module of the buck converter circuit according to the third preferred embodiment of the present invention. In the six time regions of FIG. 12, the inductor current iL is increased in regions 1, 3 and 5, but due to that the output voltage increases continuously, the current incremental slope (Vin–Vo)/L is decreasing continuously, and the current descending slope Vo/L is increasing continuously in regions 2, 4 and 6. These will result in the energy's transferring back from the output side to the input side causing by the current's flowing back when the synchronous rectifier is switching during either the last one or the last several operating periods. Thus, the logic process module 12 will omit a non-integer operating period of the last operating period or at least the last operating period or several of last operating periods of the synchronous rectification driving signal during the working time of the burst period. That is to say, the pulse of driving signal VQ2 is turned off by one of the non-integer operating period and the at least one operating period ahead of the ending of the last operating period of the driving signal VQ1 (in FIG. 12, the pulse of driving signal VQ2 is turned off at region 4 by one operating period ahead of the ending of the last operating period of the driving signal VQ1) so as to guarantee that the energy's transferring back caused by the current's flowing back would not appear. Thus, the present invention provides and intends to protect the method and the circuit thereof performing one of the functions of delaying a turn-on of one of a non-integer and at least one operating periods of synchronous rectification driving signals and turning off the synchronous rectification driving signals of a synchronous rectification circuit by ahead of one of the non-integer and the at least one operating periods of the ending of the last operating period of a corresponding switch driving signal while the synchronous rectification circuit is operated under a burst mode.

According to the aforementioned descriptions, the present invention provides an operating mode of a synchronous rectification circuit having a burst mode controller so as to decrease the losses of the synchronous rectification circuit and raises the light-load efficiency of the synchronous rectification circuit, and could be applied to a resonant converter circuit and a PWM circuit.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A synchronous rectification circuit, comprising:
   a converter comprising a first switch and a first synchronous rectifier; and
   a burst mode controller comprising a logic process module performing one of functions of delaying one of a non-integer operating period and at least one operating period to generate a synchronous rectification driving signal of the first synchronous rectifier counting from a beginning of a first pulse of a driving signal of the first switch during a working time of a burst period, and turning off the synchronous rectification driving signal of the first synchronous rectifier by one of the non-integer operating period and the at least one operating period ahead of an ending of a last operating period of the driving signal of the first switch during the working time of the burst period.

2. A circuit according to claim 1, wherein the converter is a resonant converter comprising a resonant tank having a magnetizing inductor and a transformer having a primary side connected to the first switch and a secondary side connected to the first synchronous rectifier, due to delaying one of the non-integer operating period and the at least one operating period to generate the synchronous rectification driving signal of the first synchronous rectifier counting from the beginning of the first pulse of the driving signal of the first switch during the working time of the burst period, the first synchronous rectifier is turned on when a voltage across the magnetizing inductor is in one of states of being larger than and being relatively close to a predetermined value so as to avoid an energy transferring back while the first synchronous rectifier is switching, and the predetermined value is an equivalent value on the magnetizing inductor of the primary side by reflecting an output voltage of the secondary side to the primary side.

3. A circuit according to claim 2, wherein the first synchronous rectifier comprises a body diode, and due to delaying one of the non-integer operating period and the at least one operating period to generate the synchronous rectification driving signal of the first synchronous rectifier counting from the beginning of the first pulse of the driving signal of the first switch during the working time of the burst period, the first synchronous rectifier operating under a burst mode is on after the body diode is conducting to avoid the energy transferring back so as to relatively decrease a loss of the circuit.

4. A circuit according to claim 2, wherein the resonant converter is one of a series resonant converter and a parallel resonant converter.

5. A circuit according to claim 4, wherein the series resonant converter is an LLC series resonant converter.

6. A circuit according to claim 2 further comprising a driver, wherein the logic process module comprises:
   a first D-type flip-flop receiving a burst duty cycle signal and a first pulse signal, and generating a first output signal;
   a first delay circuit receiving the first output signal and generating a first delay signal;
   a second delay circuit receiving the first delay signal and generating a second delay signal;
   a first OR gate receiving the first and a second pulse signals and generating a second output signal;
   a second D-type flip-flop receiving the second delay signal and the second output signal, and generating a third delay signal;
   a first AND gate receiving the first pulse signal and the first delay signal, and generating a first primary side switch signal;
   a second AND gate receiving the first delay signal and the second pulse signal, and generating a second primary side switch signal;
   a third AND gate receiving the first primary side switch signal and the third delay signal, and generating a first secondary side switch signal; and
   a fourth AND gate receiving the second primary side switch signal and the third delay signal, and generating a second secondary side switch signal,
   wherein the driver receives the first and the second primary side switch signals and the first and the second secondary side switch signals, and generates the synchronous rectification driving signal to drive the first synchronous rectifier.

7. A circuit according to claim 2 further comprising a second synchronous rectifier and a second to a fourth switches connected to the primary side of the transformer, wherein the burst mode controller further comprises:
   a sensing resistor electrically connected to the resonant converter and generating a load current sensing signal;
   a burst duty generator electrically connected to the sensing resistor, receiving the load current sensing signal and generating a burst duty cycle signal;
   a feedback control circuit coupled to the resonant converter, receiving an output voltage feedback signal and a reference voltage and generating a frequency control signal;
   a voltage-controlled oscillator (VCO) receiving the burst duty cycle signal and the frequency control signal and generating a first and a second pulse signals; and
   a driver receiving a first and a second primary side switch signals and a first and a second secondary side switch signals and generating a first to a fourth primary side driving signals and a first and a second secondary side driving signals,
   wherein the logic process module receives the first and the second pulses signals and the burst duty cycle signal so as to generate the first and the second primary side switch signals and the first and the second secondary side switch signals, the first to the fourth primary side driving signals are used to drive the first to the fourth switches respectively, the first and the second secondary side driving signals are used to drive the first and the second synchronous rectifiers respectively, the first secondary side driving signal is the synchronous rectification driving signal, and the first primary side driving signal is the driving signal of the first switch.

8. A circuit according to claim 1, wherein the converter is a pulse width modulation (PWM) converter.

9. A circuit according to claim 8, wherein the PWM converter is a buck converter having an inductor, and due to turning off the synchronous rectification driving signal of the first synchronous rectifier by one of the non-integer operating period and the at least one operating period ahead of the ending of the last operating period of the driving signal of the first switch during the working time of the burst period, the first synchronous rectifier is turned off when a current flowing through the inductor is reversed so as to avoid an energy transferring-back when the first synchronous rectifier is switching.

10. A circuit according to claim 9 further comprising a driver, wherein the logic process module comprises:
   a first D-type flip-flop receiving a burst duty cycle signal and a first pulse signal, and generating a first output signal;
   a first delay circuit receiving the first output signal and generating a first delay signal;
   a first AND gate receiving the first pulse signal and the first delay signal, and generating a first switch signal; and
   a second AND gate receiving the first delay signal and a second pulse signal, and generating a second switch signal,
   wherein the driver receives the first and the second switch signals and generates the driving signal and the synchronous rectification driving signal to drive the first switch and the first synchronous rectifier respectively.

11. A circuit according to claim 9, wherein the burst mode controller further comprises:
   a sensing resistor electrically connected to the buck converter and generating a load current sensing signal;
   a burst duty generator electrically connected to the sensing resistor, receiving the load current sensing signal and generating a burst duty cycle signal;
   a feedback control circuit coupled to the buck converter, receiving an output voltage feedback signal and a reference voltage, and generating a feedback control signal;
   a pulse-width modulator receiving the burst duty cycle signal and the feedback control signal, and generating a first and a second pulse signals; and a driver receiving a first and a second switch signals and generating the driving signal and the synchronous rectification driving signal to drive the first switch and the first synchronous rectifier respectively, wherein the logic process module receives the first and the second pulses signals and the burst duty cycle signal and generates the first and the second switch signals.

12. A burst mode controlling method for a synchronous rectification circuit comprising a first switch and a first synchronous rectifier, comprising one of steps of:

delaying one of a non-integer operating period and at least one operating period to generate a synchronous rectification driving signal of the first synchronous rectifier counting from a beginning of a first pulse of a driving signal of the first switch during a working time of a burst period; and turning off the synchronous rectification driving signal of the first synchronous rectifier by one of the non-integer operating period and the at least one operating period ahead of an ending of a last operating period of the driving signal of the first switch during the working time of the burst period to turn off the first synchronous rectifier.

13. A method according to claim 12, wherein the synchronous rectification circuit is a resonant converter circuit when the method performs the delaying step.

14. A burst mode controlling method for a synchronous rectification circuit comprising a first switch and a first synchronous rectifier, comprising one of steps of:

delaying one of a non-integer operating period and at least one operating period to generate a synchronous rectification driving signal of the first synchronous rectifier counting from a beginning of a first pulse of a driving signal of the first switch during a working time of a burst period; and turning off the synchronous rectification driving signal of the first synchronous rectifier by one of the non-integer operating period and the at least one operating period ahead of an ending of a last operating period of the driving signal of the first switch during the working time of the burst period to turn off the first synchronous rectifier, wherein the synchronous rectification circuit is a resonant converter circuit when the method performs the delaying step and wherein the resonant converter circuit is the synchronous rectification circuit as claimed in claim 7.

15. A method according to claim 13, wherein the synchronous rectification circuit further comprises a transformer having a primary and a secondary sides and an output capacitor coupled to the secondary side and the first synchronous rectifier, the first synchronous rectifier comprises a body diode, and the secondary side has a voltage thereon relatively very close to a voltage of the output capacitor when the body diode is turned on.

16. A method according to claim 13, wherein the synchronous rectification circuit further comprises a transformer having a primary and a secondary sides and an output capacitor coupled to the secondary side and the first synchronous rectifier, the first synchronous rectifier comprises a body diode, and the secondary side has a voltage thereon larger than a voltage of the output capacitor when the body diode is turned on.

17. A method according to claim 12, the synchronous rectification circuit is a pulse width modulation (PWM) converter circuit when the method performs the advancing step.

18. A burst mode controlling method for a synchronous rectification circuit comprising a first switch and a first synchronous rectifier, comprising one of steps of:

delaying one of a non-integer operating period and at least one operating period to generate a synchronous rectification driving signal of the first synchronous rectifier counting from a beginning of a first pulse of a driving signal of the first switch during a working time of a burst period; and turning off the synchronous rectification driving signal of the first synchronous rectifier by one of the non-integer operating period and the at least one operating period ahead of an ending of a last operating period of the driving signal of the first switch during the working time of the burst period to turn off the first synchronous rectifier, wherein the synchronous rectification circuit is a pulse width modulation (PWM) converter circuit when the method performs the advancing step and wherein the PWM converter circuit is the synchronous rectification circuit as claimed in claim 11.

19. A burst mode controlling method for a synchronous rectification circuit, wherein the synchronous rectification circuit comprises a first and a second switches and a first and a second synchronous rectifiers, comprising steps of:

turning on the first and the second synchronous rectifiers firstly by an alternate method during a plurality of burst periods;

delaying one of a non-integer operating period and at least one operating period to generate a synchronous rectification driving signal of the first synchronous rectifier counting from a beginning of a first pulse of a driving signal of the first switch during a working time of a burst period when the first synchronous rectifier is turned on firstly; and delaying one of a non-integer operating period and at least one operating period to generate a synchronous rectification driving signal of the second synchronous rectifier counting from a beginning of a first pulse of a driving signal of the second switch during a working time of a burst period when the second synchronous rectifier is turned on firstly.

20. A method according to claim 19, wherein the synchronous rectification circuit is a resonant converter circuit.

* * * * *